United States Patent
Selvaganapathy et al.

(10) Patent No.: US 11,510,056 B2
(45) Date of Patent: Nov. 22, 2022

(54) NETWORK INITIATED RE-AUTHORIZATION FOR COVERAGE ENHANCEMENT

(71) Applicant: NOKIA TECHNOLOGIES OY, Espoo (FI)

(72) Inventors: Srinivasan Selvaganapathy, Bangalore (IN); Hannu Petri Hietalahti, Kiviniemi (FI); Bruno Landais, Pleumeur-Bodou (FR); Juergen Hofmann, Merching (DE)

(73) Assignee: Nokia Technologies Oy, Espoo (FI)

( * ) Notice: Subject to any disclaimer, the term of this patent is extended or adjusted under 35 U.S.C. 154(b) by 682 days.

(21) Appl. No.: 16/484,373

(22) PCT Filed: Jan. 29, 2018

(86) PCT No.: PCT/EP2018/052068
§ 371 (c)(1),
(2) Date: Aug. 7, 2019

(87) PCT Pub. No.: WO2018/145936
PCT Pub. Date: Aug. 16, 2018

(65) Prior Publication Data
US 2020/0008063 A1 Jan. 2, 2020

(30) Foreign Application Priority Data
Feb. 8, 2017 (IN) .............................. 201711004516

(51) Int. Cl.
*H04W 68/00* (2009.01)
*H04J 3/00* (2006.01)
(Continued)

(52) U.S. Cl.
CPC ............. *H04W 12/08* (2013.01); *H04W 4/90* (2018.02); *H04W 8/18* (2013.01); *H04W 48/16* (2013.01); *H04W 68/02* (2013.01)

(58) Field of Classification Search
CPC ......... H04W 12/08; H04W 4/90; H04W 8/18; H04W 48/16; H04W 68/02
(Continued)

(56) References Cited

U.S. PATENT DOCUMENTS

| 2016/0286524 A1* | 9/2016 | Griot ................... H04W 68/025 |
| 2018/0027483 A1* | 1/2018 | You ....................... H04L 5/0053 370/336 |
| 2019/0174270 A1* | 6/2019 | Shan ....................... H04W 4/70 |

OTHER PUBLICATIONS

Office Action for European Application No. 18702650.5, dated Feb. 4, 2022, 5 pages.
(Continued)

*Primary Examiner* — Mark G. Pannell
(74) *Attorney, Agent, or Firm* — Brake Hughes Bellermann LLP

(57) ABSTRACT

Network initiated re-authorization for coverage enhancement It is provided a method, comprising checking if a device is authorized for initiating an access in an extended coverage; inhibiting the device to initiate the access while the device camps in the extended coverage and the device is not authorized for the initiating of the access in the extended coverage; monitoring if a paging message for the device is received while the device camps in the extended coverage, wherein the paging message is to initiate a signaling access in the extended coverage for a signaling procedure to get the latest status of coverage authorization; allowing the device to initiate the signaling access while the device camps in the extended coverage if the paging message is received.

14 Claims, 6 Drawing Sheets

(51) Int. Cl.
*H04H 20/71* (2008.01)
*H04W 12/08* (2021.01)
*H04W 4/90* (2018.01)
*H04W 8/18* (2009.01)
*H04W 48/16* (2009.01)
*H04W 68/02* (2009.01)

(58) Field of Classification Search
USPC .............................................................. 726/4
See application file for complete search history.

(56) References Cited

OTHER PUBLICATIONS

Office Action for India Application No. 201711004516, dated Jan. 6, 2022, 9 pages.
Office Action for European Application No. 18702650.5, dated Jul. 16, 2021, 5 pages.
3GPP TSG-RAN2 Meeting #95bis; R2-166564; Authorization of Use of Coverage Enhancements; Kaohsiung, Taiwan; Oct. 10-14, 2016; 6 pages.
Office Action for European Application No. 18702650.5, dated Jan. 21, 2021, 5 pages.
International Search Report and Written Opinion for International Application No. PCT/EP2018/052068, dated Apr. 12, 2018 (16 pages).
SA WG2 Meeting #110, S2-152548, Qualcomm Incorporated; "Proposal for Paging for Coverage Enhancement"; Agenda Item: 6.12; FS_AE_CIoT and TEI13/Rel.13; Dubrovnik, Croatia; Jul. 6-10, 2015; pp. 1-9.

\* cited by examiner

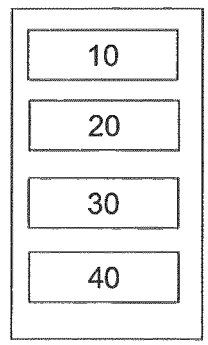
Fig. 5
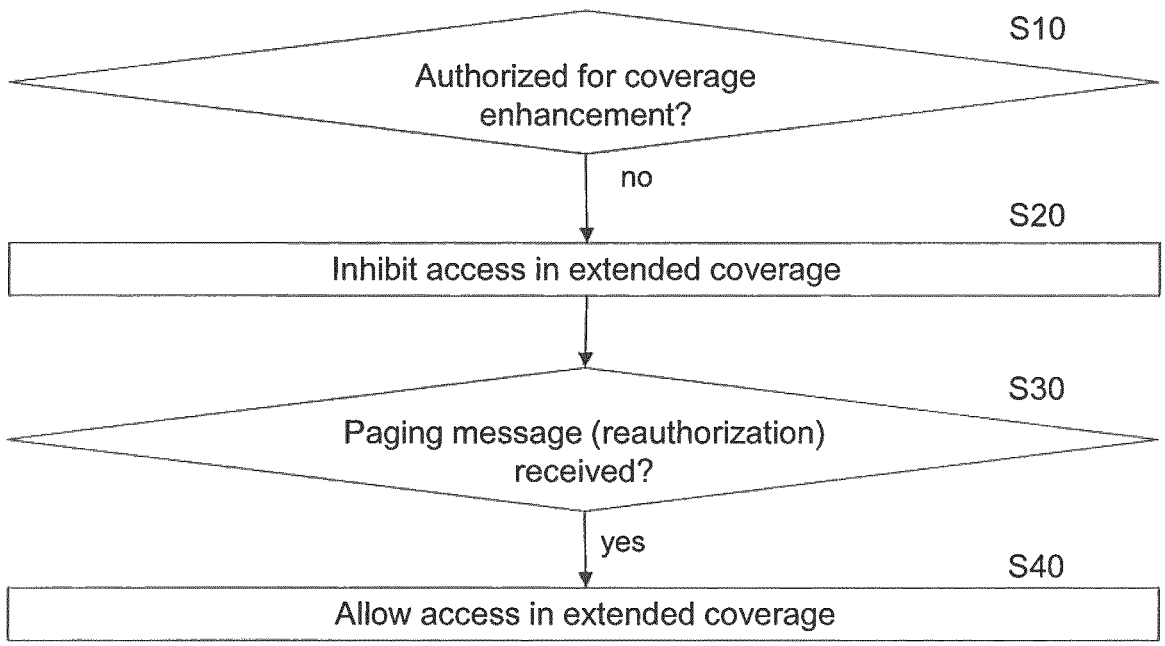
Fig. 7
Fig. 6
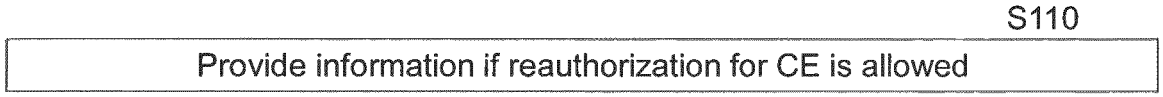
Fig. 8

NETWORK INITIATED RE-AUTHORIZATION FOR COVERAGE ENHANCEMENT

CROSS-REFERENCE TO RELATED APPLICATIONS

This application is a national stage entry of International Application No. PCT/EP2018/052068, filed Jan. 29, 2018, entitled "NETWORK INITIATED RE-AUTHORIZATION FOR COVERAGE ENHANCEMENT" which claims the benefit of priority of Indian Application No. 201711004516, filed Feb. 8, 2017, both of which are hereby incorporated by reference in their entireties.

FIELD OF THE INVENTION

The present invention relates to an apparatus, a method, and a computer program product related to coverage enhancement. More particularly, the present invention relates to an apparatus, a method, and a computer program product related to authorization for coverage enhancement.

Abbreviations

3GPP Third Generation Partnership Project
4G $4^{th}$ Generation
5G $5^{th}$ Generation
AS Application Server
BSS Base Station Subsystem
CE Coverage Enhancement
CIoT Cellular IoT
CIoT_Ext Extended CIoT
CMAS Commercial Mobile Alert System
CN Core Network
CS Cell Selection
CSG Closed Subscriber Group
EC-GSM-IoT Extended Coverage-GSM-IoT
eDRX Extended Discontinous Reception
EPS Evolved Packet System
ETWS Earthquake and Tsunami Warning System
GPRS General Packet Radio System
GSM Global System for Mobile Communication
HSS Home Subscriber Server
IoT Internet of Things
LTE Long Term Evolution
LTE-A LTE-Advanced
MM Mobility Management
MME Mobility Management Entity
NAS Non-Access Stratum
NB-IoT Narrowband-IoT
NW Network
PLMN Public Land Mobile Network
RACH Random Access Channel
RAT Radio Access Technology
RAU Routing Area Update
Rel Release
RRC Radio Resource Control
SCEF Service Capability Exposure Function
SCS Service Capability Server
SGSN Serving GPRS Support Node
SIM Subscriber Identity Module
TA Tracking Area
TAU Tracking Area Update
TR Technical Report
TS Technical Specification
UE User Equipment
USIM Universal SIM

BACKGROUND OF THE INVENTION

Cellular network support for providing connectivity for low complexity IoT devices was studied and new solutions are introduced in 3GPP Rel-13 and Rel-14 under work items CIoT, CIoT_Ext, NB-IoT and EC-GSM-IoT, hereinafter shortly denoted as CIoT. All these solutions provide extended coverage up to 20 dB, increased battery life-time up to 10 years and lower device complexity.

Extended coverage operation is an important feature of a CIoT solution. The CIoT device is able to operate in extended coverage condition with the use of new logical channels where multiple blind physical layer transmissions are used to achieve the extended coverage operation. Use of blind physical layer transmissions requires additional resources compared to normal operations. Until 3GPP Rel-13, the use of blind physical layer transmissions is a default feature for all CIoT devices.

The use of coverage enhancement increases the consumption of radio resources. If it is used by all the CIoT devices, it may result in resource congestion in the network. Moreover the use of coverage enhancements for applications which are not related to IoT devices also needs to be controlled by the operator. For instance the use of coverage extension feature by a smartphone device will lead to higher resource utilisation because of frequent and large amount of transmissions. Moreover when the network load is high, there should be a means to activate the coverage extension features only for priority users.

A Coverage Enhancement Authorisation feature is proposed in 3GPP TR 23.730 (Rel-14) to address the above key issues. As per v14.0.0 of this TR, the subscription profile will have an additional parameter to indicate whether Coverage Enhancement (CE) is allowed for UE or not. Core Network (MME/SGSN) then informs the UE about whether it is permitted to use CE as part of the Tracking Area Update, Routeing Area Update or Attach procedure. When the UE receives the indication that CE is disabled, the UE will only consider the cells in normal coverage for camping.

When the UE receives the indication that CE is disabled, it behaves as follows:
The UE will attempt to camp on suitable cells which provide normal coverage.
If no suitable cells in normal coverage are available, the UE attempts to find acceptable cell of any PLMN which provides normal coverage.
If an acceptable cell can be found, the UE camps on it in limited service state. In this case, only emergency access (potentially including ETWS and CMAS) is possible.
In limited service state, the UE is not allowed to initiate any other access than emergency access, it does not listen to paging, and therefore the UE is not reachable.
If acceptable cell cannot be found, UE will remain in "Any cell selection state" (see FIG. 1) where it continuously tries to find a suitable cell or an acceptable cell. Also in this state the UE is not reachable.

The concept of "acceptable cell" and "suitable cell" are well-defined reserved words in 3GPP specifications. Their meaning is substantially the same across all existing 3GPP RATs. For reference, the EPS definitions of these terms are extracted below from 3GPP TS 36.304:
Acceptable cell:
An "acceptable cell" is a cell on which the UE may camp to obtain limited service (originate emergency calls and receive ETWS and CMAS notifications). Such a cell shall fulfil the following requirements, which is the minimum set of requirements to initiate an emergency call and to receive ETWS and CMAS notification in a E-UTRAN network:

The cell is not barred, see subclause 5.3.1;
The cell selection criteria are fulfilled, see subclause 5.2.3.2;

Suitable cell:
A "suitable cell" is a cell on which the UE may camp on to obtain normal service. The UE shall have a valid USIM and such a cell shall fulfil all the following requirements.

The cell is part of either:
the selected PLMN, or:
the registered PLMN, or:
a PLMN of the Equivalent PLMN list
For a CSG cell, the cell is a CSG member cell for the UE;

According to the latest information provided by NAS:
The cell is not barred, see subclause 5.3.1;
The cell is part of at least one TA that is not part of the list of "forbidden tracking areas for roaming" [4], which belongs to a PLMN that fulfils the first bullet above;
The cell selection criteria are fulfilled, see subclause 5.2.3.2;

In the present application, these meanings shall apply, too, but they may be adapted according to the respective RAT to which the invention is applied. As a minimum definition, an "acceptable cell" is a cell on which the UE may camp to obtain limited service only (limited service=originate emergency calls, and receive ETWS and CMAS notifications if applicable), and a "suitable cell" is a cell on which the UE may camp on to obtain normal service, i.e. a service without the restrictions of the limited service.

The architecture enhancements related to CIoT functionality are studied in Rel-13 in 3GPP TR 23.720. New 3GPP TR 23.730 was opened for subsequent Rel-14 CIoT Extensions work. The normative stage 2 specifications 3GPP TS 23.401 and TS 23.682 document the agreed candidate solutions in both releases. The corresponding stage 3 TSs are 3GPP TS 24.301, 29.128, 29.060.

CE behaviour is described in 3GPP TS 36.300 (NB-IoT) and 43.064 (EC-GSM-IoT).

As per cell selection states defined in 3GPP TS 36.304 and PLMN selection defined in 3GPP TS 23.122, a UE that cannot find any suitable cells will camp on an acceptable cell in limited service state. At this state only emergency calls are allowed. As there is no CS support in this limited state, CIoT device cannot provide any services to applications.

The states and associated state transitions of RRC-Idle state of the UE according to the prior art are shown in FIG. 1, taken from 3GPP TS 36.304 V14.1.0. When the CE authorisation feature is enabled, UE will move to "Any Cell Selection" state when it does not find a suitable cell in normal coverage. If the UE finds an acceptable cell in normal coverage (e.g. cell belongs to other PLMN) it may transition to "Camped on any cell" state. Whenever a new PLMN selection is performed, it causes an exit to number 1.

SUMMARY OF THE INVENTION

It is an object of the present invention to improve the prior art.

According to a first aspect of the invention, there is provided apparatus, comprising at least one processor, at least one memory including computer program code, and the at least one processor, with the at least one memory and the computer program code, being arranged to cause the apparatus to at least perform at least checking if a device is authorized for initiating an access in an extended coverage; inhibiting the device to initiate the access while the device camps in the extended coverage and the device is not authorized for the initiating of the access in the extended coverage; monitoring if a paging message for the device is received while the device camps in the extended coverage, wherein the paging message is to initiate a signaling access in the extended coverage for a signaling procedure to get the latest status of coverage authorization; allowing the device to initiate the signaling access while the device camps in the extended coverage if the paging message is received.

The at least one memory and the computer program code may be arranged to cause the apparatus to further perform checking if a reauthorization for initiating the access in the extended coverage is allowed for the device; prohibiting, if the reauthorization is not allowed, the device to monitor if the paging message for the device is received.

The at least one memory and the computer program code may be arranged to cause the apparatus to further perform monitoring if camping on a suitable cell in a normal coverage is possible, wherein, in the normal coverage, the device is authorized to initiate the access; monitoring if camping on the suitable cell in the extended coverage is possible; instructing the device to camp on the suitable cell in extended coverage if camping on the suitable cell in the normal coverage is not possible, camping on the suitable cell in extended coverage is possible, and the reauthorization is allowed, regardless of whether or not camping on an acceptable cell is possible.

The monitoring if the paging message is received may be performed with a different discontinuous reception period than the monitoring for a normal paging message different from the paging message indicating that the device is to become authorized.

The at least one memory and the computer program code may be arranged to cause the apparatus to further perform checking if a support for emergency calls is required; determining if camping on the acceptable cell in the normal coverage is possible; inhibiting the instructing of the device to camp on the suitable cell and instructing the device to camp on the acceptable cell if the support for emergency calls is required and camping on the acceptable cell in the normal coverage is possible.

The at least one memory and the computer program code may be arranged to cause the apparatus to further perform reauthorizing the device to initiate the access in the extended coverage during a signaling exchange taking place after the UE gets the paging request.

The signaling exchange may be a tracking area update signaling exchange.

According to a second aspect of the invention, there is provided an apparatus, comprising at least one processor, at least one memory including computer program code, and the at least one processor, with the at least one memory and the computer program code, being arranged to cause the apparatus to at least perform at least providing, in response to a request for subscription information of a subscriber, an indication whether or not a reauthorization for initiating an access in the extended coverage is allowed for the subscriber.

According to a third aspect of the invention, there is provided an apparatus, comprising at least one processor, at least one memory including computer program code, and the at least one processor, with the at least one memory and the computer program code, being arranged to cause the apparatus to at least perform at least monitoring if an authorization change information is received or detected, wherein the authorization change information indicates that a device is to become authorized for initiating an access in an extended coverage; requesting paging the device if the authorization change information is received or detected, respectively, wherein the paging comprises an indication that the device is to become authorized for the initiating of the access in the extended coverage.

The at least one memory and the computer program code may be arranged to cause the apparatus to further perform checking if a reauthorization for the initiating of the access in the extended coverage is allowed for the device; inhibiting the paging the device if the reauthorization is not allowed.

According to a fourth aspect of the invention, there is provided an apparatus, comprising at least one processor, at least one memory including computer program code, and the at least one processor, with the at least one memory and the computer program code, being arranged to cause the apparatus to at least perform at least monitoring if an authorization change information is received, wherein the authorization information indicates that a device is to become authorized for initiating an access in an extended coverage; paging the device if the authorization change information is received, wherein the paging comprises an indication that the device is to become authorized for the initiating of the access in the extended coverage.

The at least one memory and the computer program code may be arranged to cause the apparatus to further perform checking if the device camps in the extended coverage; inhibiting the paging the device if the device does not camp in the extended coverage.

The paging may be done with a discontinuous reception period different from a discontinuous reception period of a normal paging, wherein the normal paging is different from the paging comprising the indication that the device is to become authorized.

According to a fifth aspect of the invention, there is provided a method, comprising checking if a device is authorized for initiating an access in an extended coverage; inhibiting the device to initiate the access while the device camps in the extended coverage and the device is not authorized for the initiating of the access in the extended coverage; monitoring if a paging message for the device is received while the device camps in the extended coverage, wherein the paging message is to initiate a signaling access in the extended coverage for a signaling procedure to get the latest status of coverage authorization; allowing the device to initiate the signaling access while the device camps in the extended coverage if the paging message is received.

The method may further comprise checking if a reauthorization for initiating the access in the extended coverage is allowed for the device; prohibiting, if the reauthorization is not allowed, the device to monitor if the paging message for the device is received.

The method may further comprise monitoring if camping on a suitable cell in a normal coverage is possible, wherein, in the normal coverage, the device is authorized to initiate the access; monitoring if camping on the suitable cell in the extended coverage is possible; instructing the device to camp on the suitable cell in extended coverage if camping on the suitable cell in the normal coverage is not possible, camping on the suitable cell in extended coverage is possible, and the reauthorization is allowed, regardless of whether or not camping on an acceptable cell is possible.

The monitoring if the paging message is received may be performed with a different discontinuous reception period than the monitoring for a normal paging message different from the paging message indicating that the device is to become authorized.

The method may further comprise checking if a support for emergency calls is required; determining if camping on the acceptable cell in the normal coverage is possible; inhibiting the instructing of the device to camp on the suitable cell and instructing the device to camp on the acceptable cell if the support for emergency calls is required and camping on the acceptable cell in the normal coverage is possible.

The method may further comprise reauthorizing the device to initiate the access in the extended coverage during a signaling exchange taking place after the UE gets the paging request.

The signaling exchange may be a tracking area update signaling exchange.

According to a sixth aspect of the invention, there is provided a method, comprising providing, in response to a request for subscription information of a subscriber, an indication whether or not a reauthorization for initiating an access in the extended coverage is allowed for the subscriber.

According to a seventh aspect of the invention, there is provided a method, comprising monitoring if an authorization change information is received or detected, wherein the authorization change information indicates that a device is to become authorized for initiating an access in an extended coverage; requesting paging the device if the authorization change information is received or detected, respectively, wherein the paging comprises an indication that the device is to become authorized for the initiating of the access in the extended coverage.

The method may further comprise checking if a reauthorization for the initiating of the access in the extended coverage is allowed for the device; inhibiting the paging the device if the reauthorization is not allowed.

According to an eighth aspect of the invention, there is provided a method, comprising monitoring if an authorization change information is received, wherein the authorization information indicates that a device is to become authorized for initiating an access in an extended coverage; paging the device if the authorization change information is received, wherein the paging comprises an indication that the device is to become authorized for the initiating of the access in the extended coverage.

The method may further comprise checking if the device camps in the extended coverage; inhibiting the paging the device if the device does not camp in the extended coverage.

The paging may be done with a discontinuous reception period different from a discontinuous reception period of a normal paging, wherein the normal paging is different from the paging comprising the indication that the device is to become authorized.

Each of the methods of the fifth to eighth aspects may be a method of coverage enhancement authorization.

According a ninth aspect of the invention, there is provided a computer program product comprising a set of instructions which, when executed on an apparatus, is configured to cause the apparatus to carry out the method according to any of the fifth to eighth aspects.

The computer program product may be embodied as a computer-readable medium or directly loadable into a computer.

According to some embodiments of the invention, at least one of the following advantages may be achieved:
  Authorization for CE may be modified even if the device camps on a suitable cell in extended coverage;
  Battery consumption of the IoT device may be minimized;
  Congestion may be minimized;
  The concept of extended coverage and coverage enhancement is substantially maintained, thus backward compatibility is ensured.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 5 shows an apparatus according to an embodiment of the invention;

FIG. 6 shows a method according to an embodiment of the invention;

FIG. 7 shows an apparatus according to an embodiment of the invention;

FIG. 8 shows a method according to an embodiment of the invention;

DETAILED DESCRIPTION OF CERTAIN EMBODIMENTS

Figure 1:
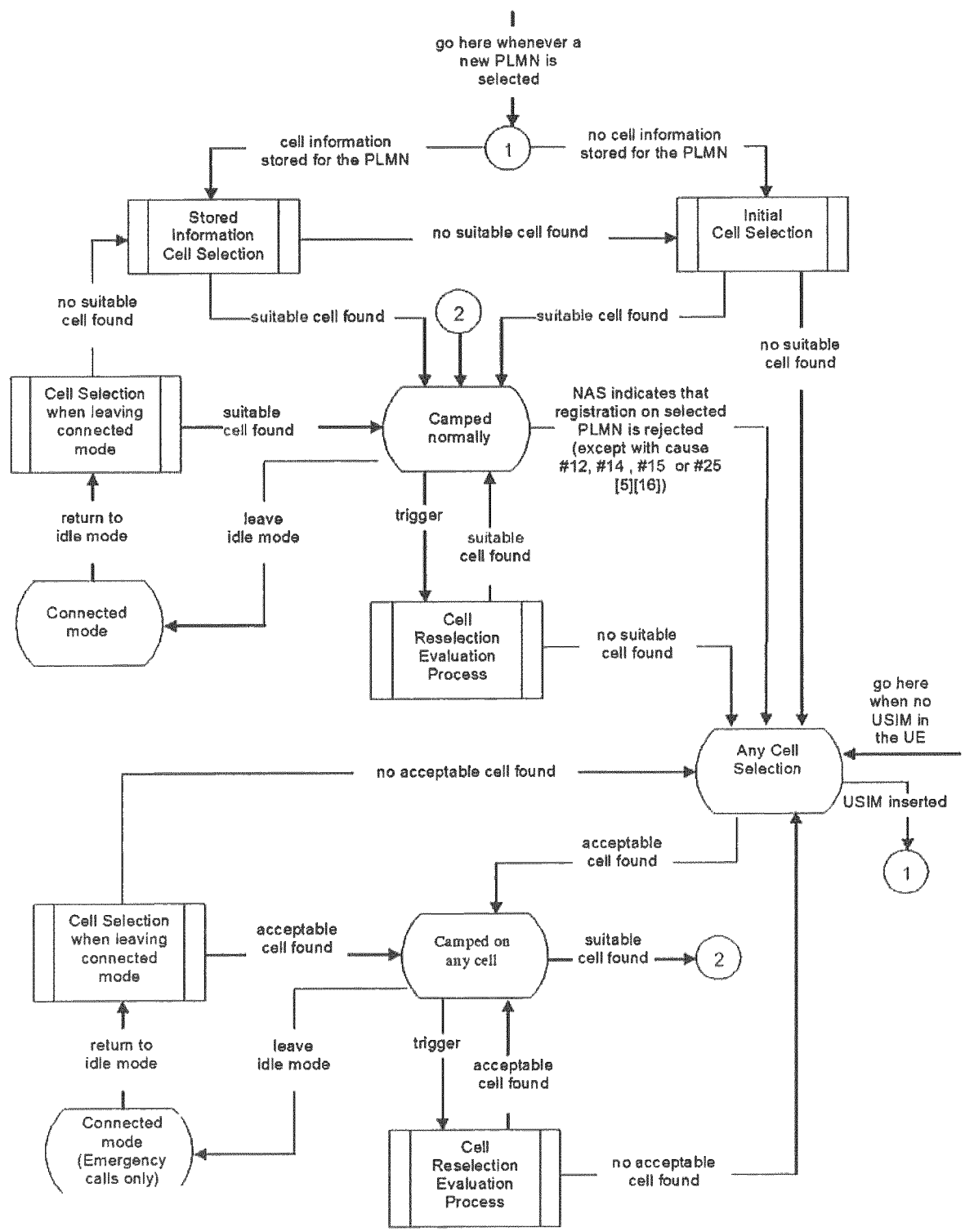
FIG. 1 shows states and associated state transitions of RRC-Idle state of the UE according to 3GPP TS 36.304 V14.1.0, FIG. 5.2.2-1.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of this invention are related to an architecture enhancement for control of coverage enhancement authorisation feature of a CIoT device by the core network.

If the UE ends up in limited service state as explained in the background section, then, even if the UE is subsequently authorised for CE at the network side, there is no way to communicate this authorisation to the UE. To recover from this situation, the UE needs to be powered OFF and ON, or it would first need to find a suitable cell that it can access in normal service mode.

For some specific IoT device deployments manual power OFF/ON may not be feasible. Namely, different from mobile phones, the cellular IoT devices are mostly deployed in unattended conditions. So manual power cycle to recover to normal state is often not feasible. As another example, a telemetry device installed in the basement in bad coverage may not find a suitable cell at all. Hence there is no way to authorise Coverage Extension for such device remotely over the air.

Some embodiments of the invention provide enhancements to CE authorisation functionality with additional support for network recovery for a selected subscription profile. With this enhancement it is possible to communicate the CE status change to UE without impacting the basic requirement of CE authorisation.

According to some embodiments of the invention, the CE Authorisation feature is changed as follows:
  A. When the UE receives CE-Allowed parameter set to 'No':
    1) The UE will attempt to select a suitable cell in normal coverage for camping.
    2) If no suitable cell in normal coverage is found, UE selects a suitable cell in extended coverage and camps on that cell.
    3) In this suitable cell in extended coverage, the UE will not initiate any uplink transmission (unless being paged for CE Reauthorization, see further down) and also will not listen to paging channels (unless for being paged for CE Reauthorization, see further down).
    4) Instead, the UE periodically searches for a suitable cell in normal coverage and also checks the paging channel of the current serving cell in extended coverage cell for CE Reauthorisation. This new state is further referred as Camped For CE Reauthorisation".

Note that, in the cell selection process A according to some embodiments of the invention, in step 2) a suitable cell in extended coverage is preferred over an acceptable cell with normal coverage, which is preferred according to the conventional cell selection process.

B. When the CE Authorization status (i.e. CE-Allowed parameter) is changed to enabled in the network, e.g. upon receipt of a subscription change from the HSS or when detecting changes of conditions in the network load that allow other devices to use CE, the CN (MME or SGSN), via the eNB, sends a new paging message (e.g. a Page message with the cause: CE Reauthorisation), preferably using the highest coverage class.
    1) Upon receipt of the Page for CE Reauthorisation, the UE sends RACH Access, with blind physical layer transmissions according to the coverage condition, and sends the NAS message to respond to the page. The NAS message can be e.g. a tracking area update or page response.

2) CN updates the latest CE status in the TAU response or a new message as a result of the Paging procedure for CE Re-authorisation.

As a result of this paging procedure, the use of CE is re-authorized for the UE.

In some embodiments of the invention, a new subscription information is defined in the user profile in the HSS to indicate whether the above described paging procedure is enabled (allowed) or disabled (not allowed) for the user. E.g. the UE Subscription information at HSS may include a new parameter such as CE-Reauthorisation-Update-Allowed along with the CE-Allowed parameter.

If this new parameter is adopted, the selection process described under A hereinabove and/or the paging procedure described under B hereinabove may be performed only if the new parameter (CE-Reauthorization-Update-Allowed) is set to "allowed". Otherwise, a conventional cell selection process may be performed and/or no paging procedure may be performed, respectively.

In some embodiments of the invention, the UE gets informed about the new parameter (CE-Reauthorization-Update-Allowed), e.g. at attach or handover. If the new parameter is set to "not allowed", the UE does not monitor if a paging message according to B is sent, regardless of whether or not the network sends such paging message.

In some embodiments of the invention, the paging for CE Reauthorization may be done with a different eDRX cycle/periodicity than the regular (normal) eDRX cycle.

In some embodiments of the invention, the paging for CE Reauthorization may be related to certain applications or services only. In this case, the UE in extended coverage may initiate an access to the network for these certain applications or services but not for other applications and services. I.e., the UE gets a kind of a functionally restricted coverage enhancement.

That is, some embodiments of the invention may provide one or more of the following features:

The network is capable to reauthorize a UE that is in extended coverage to use the Coverage Enhancement feature.

A new UE state "Camped for CE Re-Authorisation" for selected subscribers when CE is disabled is defined. In this state where the UE only listens to paging channel in extended coverage for CE Reauthorisation without providing any other services to applications.

Triggering of new Paging message for CE Reauthorisation, potentially using different eDRX cycle, and potentially using highest coverage class, when the MME/SGSN needs to re-authorize the use of CE for the user, e.g. upon a subscription change re-authorizing the use of CE extension, Triggering of new paging cause for CE Reauthorization, in case the UE camps on a cell or is in connected mode in normal coverage to either authorise or deauthorise CE for a particular UE or for certain applications assigned to the UE, respectively.

Compared to the conventional cell selection scheme shown in FIG. 1, some embodiments of the invention provide a new state when no suitable cell is found in normal coverage for UE which has CE disabled and CE-Reauthorisation-Update-allowed set to 'allowed'. In this state UE does not provide any services to the application layer but only waits for paging messages for CE Reauthorisation.

Figure 2:
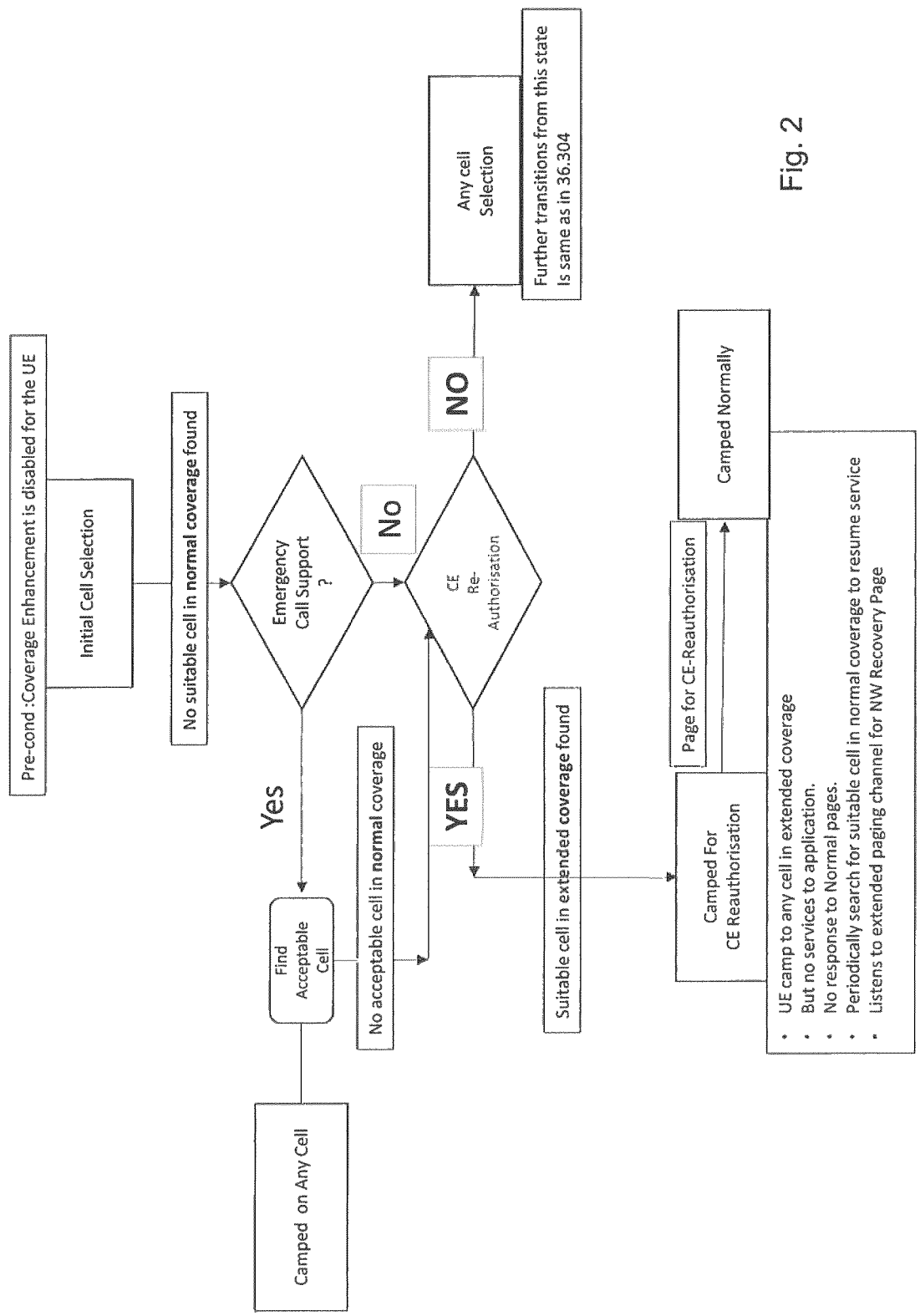
FIG. 2 shows a state transition diagram according to some embodiments of the invention.

The modified state transition diagram including the new state according to some embodiments of the invention is given in FIG. 2, which only shows a part of FIG. 1. The remaining parts of FIG. 1 remain unmodified. In FIG. 2, the new state in the idle mode state transitions is named "Camped For CE Reauthorisation".

This state "Camped for CE Reauthorisation" is same as the state "Camped Normally" with the difference that the UE will only receive incoming page for CE Re-authorisation in this state and does not provide any services to its applications.

That is, if a suitable cell in normal coverage is not found while the UE is in "Initial Cell Selection" state, it is checked if emergency call support is required. If emergency call support is required, an acceptable cell is searched and, if an acceptable cell in normal coverage is found, the UE moves to state "Camped on Any Cell", known from the conventional state transition diagram of FIG. 1. If an acceptable cell in normal coverage is not found, or if emergency call support is not needed, a check is made if the CE Reauthorization is allowed for the UE.

If CE Reauthorization is not allowed, or if a suitable cell in extended coverage is not found, the UE moves into state "Any cell selection", and further transitions are as known from the conventional state transition diagram of FIG. 1.

On the other hand, if CE Reauthorization is allowed and a suitable cell in extended coverage is found, the UE moves into the new state "Camped for CE Reauthorization" where it waits for a an incoming page for CE Reauthorization. If such page is received, the UE moves into state "Camped normally" of the conventional state transition diagram of FIG. 1.

Figure 3:
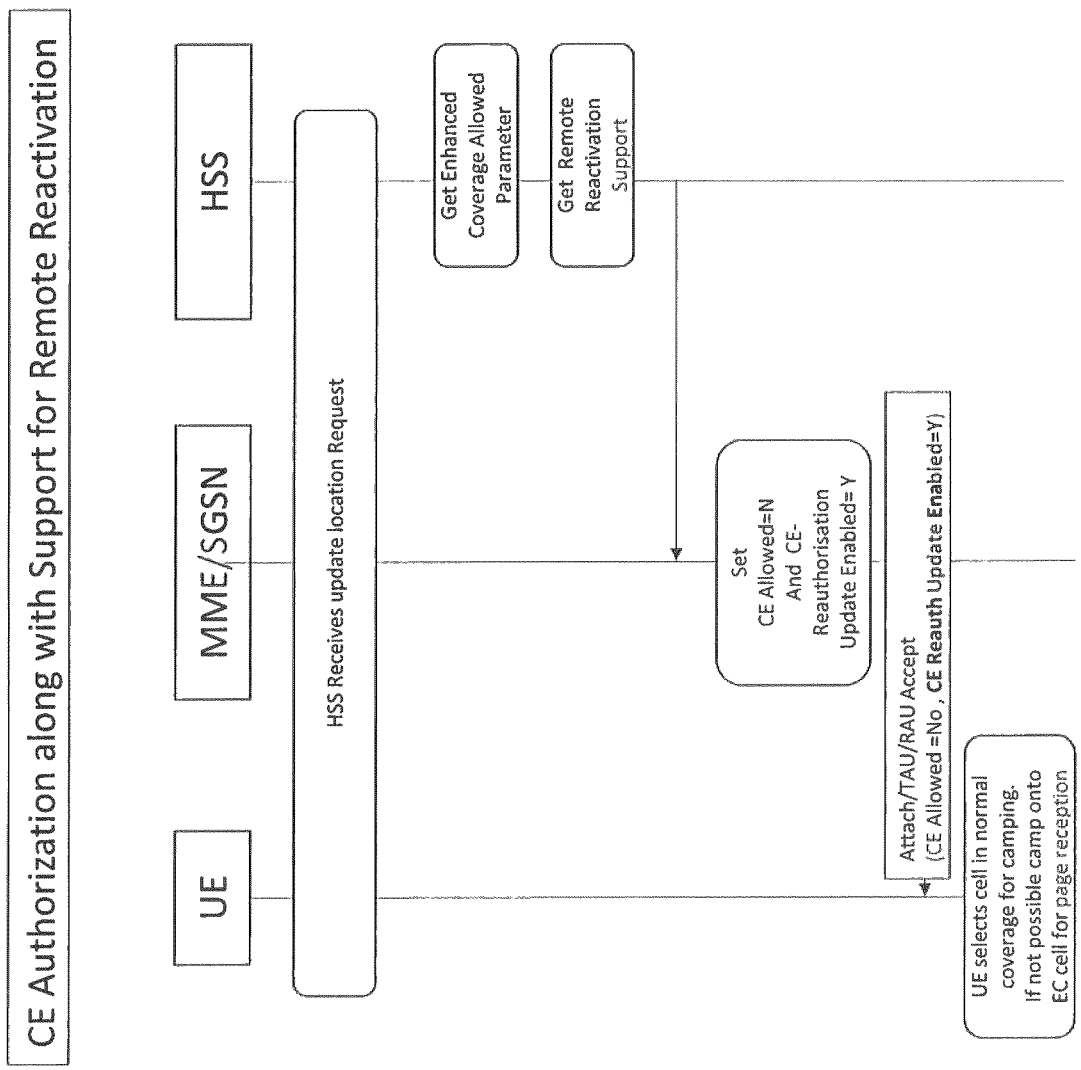
FIG. 3 show a message sequence diagram according to some embodiments of the invention.

FIG. 3 shows a message sequence diagram for disabling the CE with CE Reauthorization allowed according to some embodiments of the invention.

If the HSS receives an update location request (e.g. attach request, TAU request, or RAU request), it retrieves, from its database a parameter indicating if coverage enhancement is allowed, and if remote reactivation is supported, i.e. if CE Reauthorization is allowed and provides them to the MME/SGSN. Then, MME/SGSN provides these parameters (via eNB) to UE. Thus, if UE cannot camp in normal coverage, it camps in extended coverage without coverage enhancement, waiting for a paging message for reauthorization (state: "Camped for CE Reauthorization" of FIG. 2).

In addition, a new eDRX cycle may be provided to UE (e.g. during the TAU/RAU/Attach procedure) specifically for the purpose of monitoring for the paging message for reauthorization which can be different from the eDRX cycle negotiated for normal paging reception. In some embodiments, the new eDRX cycle for paging with CE Reauthorization may be preconfigured.

Figure 4:
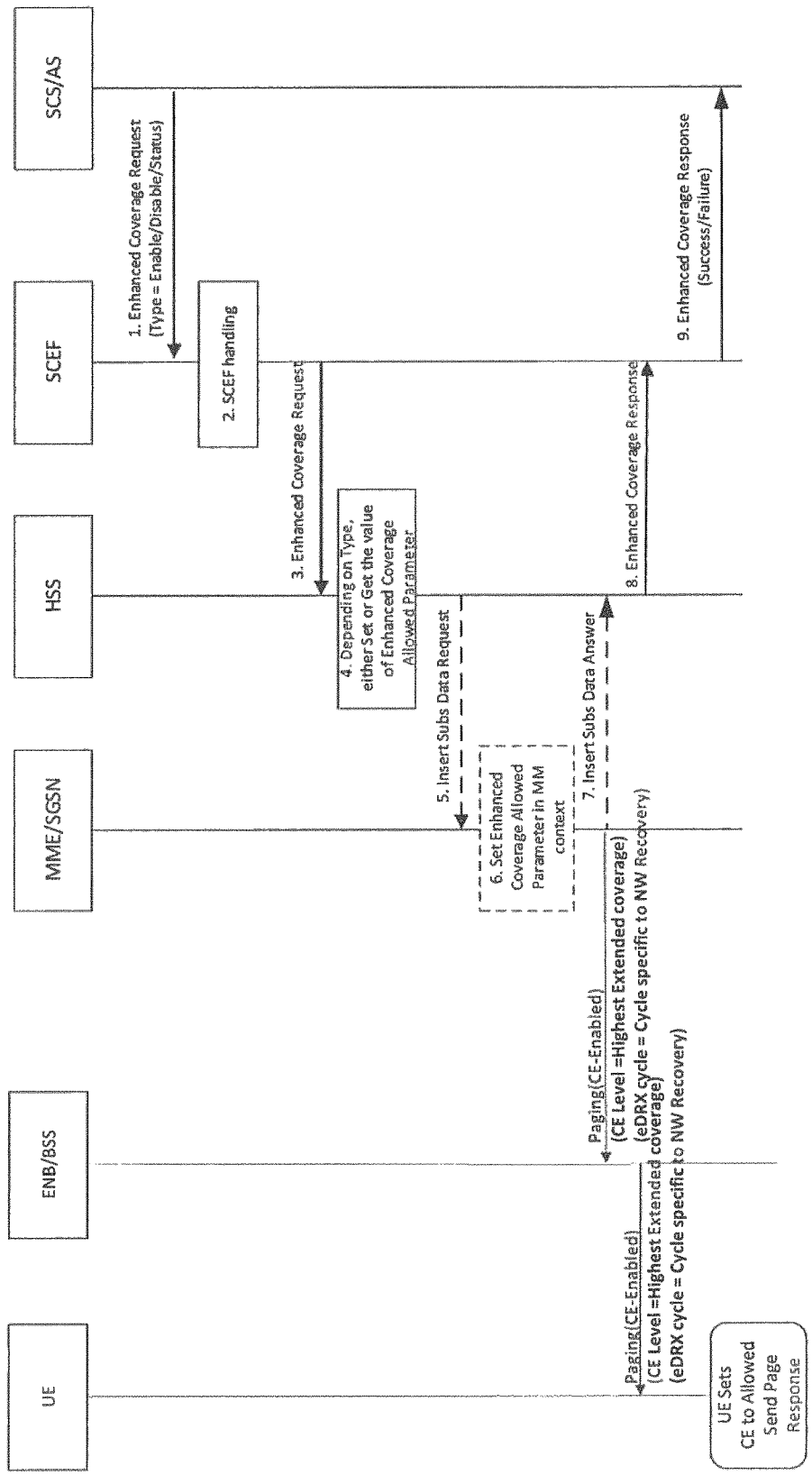
FIG. 4 shows a message flow according to some embodiments of the invention.

FIG. 4 shows a message flow according to some embodiments of the invention. FIG. 4 shows modifications of FIG. 6.1.1.4-1 of 3GPP TR 23.730. In detail, the messages to eNB/BSS and UE are added to the Figure of the prior art.

If SCS or AS requests to enable enhanced coverage, after normal SCEF handling, the enhanced coverage parameter is set in the HSS to allowed. This parameter is then set in the MM context by MME/SGSN which requests eNB (BSS) to page the UE with the new paging message indicating the CE is allowed. eNB (BSS) pages the UE, typically with highest extended coverage and potentially with the eDRX cycle agreed for CE Reauthorization (=Network recovery). If UE receives the new paging message, it sets CE to "allowed" and responds accordingly to the paging.

In some embodiments, paging is only requested or performed if CE Reauthorization is allowed, and/or the UE monitors for the new paging message only if CE Reauthorization is allowed.

For CE Reauthorisation message sequence, on reception of the paging message with CE-Enabled set in the paging message which is sent on the extended coverage channel, according to some embodiments of the invention, different procedures are possible to resume the services:

Option 1: UE triggers Tracking Area Update/Routing Area update procedure on reception of this page message. As part of this procedure, the latest CE value is updated to UE. This procedure may have more signaling steps compared to single step activation of option 2.

Option 2: UE sends Page Response message to MME/SGSN. MME/SGSN sends new message in response to page response which will update the latest status of CE Allowed parameter in the UE. This mechanism ensures that the UE activates the CE Feature based on network command sent using secured NAS message. The page is used to trigger the UE to send page-response using extended coverage channels.

The decision of MME/SGSN to send the page for CE Reauthorisation using normal paging or extended paging channel depends on the last activity of the UE. In case the UE was already in cell in normal coverage and the transaction (i.e. change of CE allowed status) was noticed within a specific time, MME/SGSN may choose to send the first page for reactivation, using normal page message. In case of no response, MME may choose to send this page using extended coverage. These may be implementation options for MME/SGSN to optimise the network initiated recovery for Coverage Enhancement Authorisation procedure.

FIG. 5 shows an apparatus according to an embodiment of the invention. The apparatus may be a terminal such as a UE, an IoT device, or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises checking means 10, inhibiting means 20, monitoring means 30, and allowing means 40. The checking means 10, inhibiting means 20, monitoring means 30, and allowing means 40 may be checking processor, inhibiting processor, monitoring processor, and allowing processor, respectively.

The checking means 10 checks if a device is authorized for initiating an access in an extended coverage (S10). In other words, the checking means 10 checks if coverage enhancement is allowed for the UE. The device may be the UE or IoT device, in particular if the apparatus is an element thereof.

While the device is not authorized for the initiating of the access in the extended coverage (S10="no"), the inhibiting means 20 inhibits the device to initiate the access while the device camps in the extended coverage (S20).

The monitoring means 30 monitors if a paging message for the device is received while the device camps in the extended coverage (S30). The paging message monitored by the monitoring means 30 indicates that the device is to become authorized for the initiating of the access in the extended coverage. That is, the paging message indicates that the device becomes authorized for coverage enhancement.

If the paging message indicating that the device becomes authorized for coverage enhancement is received (S30="yes"), the allowing means 40 allows the device to initiate a signaling access while the device camps in the extended coverage (S40). The signaling access is at least for a signaling procedure to get the latest status of coverage authorization. The reauthorization for coverage enhancement may then be performed by a subsequent signaling exchange, in particular a TAU signaling exchange. For example, the reauthorization may be performed if the received latest status of coverage authorization indicates that the device is now authorized for coverage enhancement.

FIG. 7 shows an apparatus according to an embodiment of the invention. The apparatus may be a data repository such as a HSS, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises providing means 110. The providing means 110 may be a providing processor.

In response to a request for subscription information of a subscriber, the providing means 110 provides an indication whether or not a reauthorization for initiating an access in the extended coverage is allowed for the subscriber (S110). In other words, the providing means 110 provides an indication whether reauthorization for coverage enhancement is allowed for the subscriber.

Figure 9:
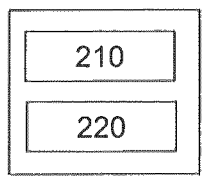
FIG. 9 shows an apparatus according to an embodiment of the invention.
Figure 10:
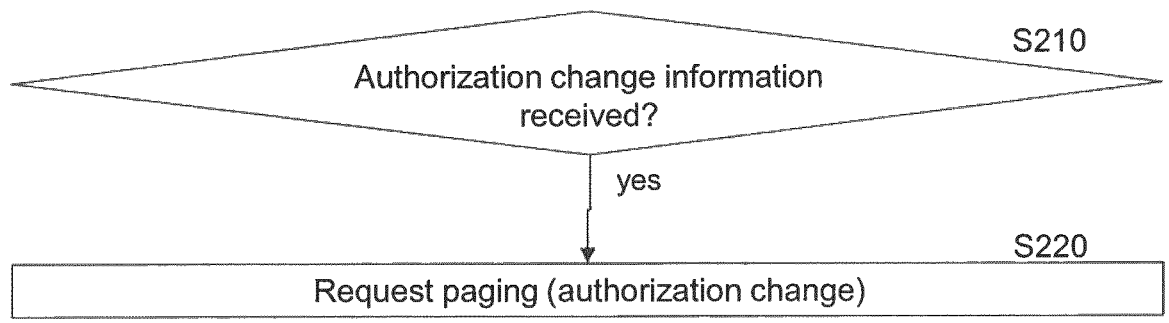
FIG. 10 shows a method according to an embodiment of the invention.

FIG. 9 shows an apparatus according to an embodiment of the invention. The apparatus may be a network element such as a MME, a SGSN, or a eNB, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises monitoring means 210, and requesting means 220. The monitoring means 210, and requesting means 220 may be monitoring processor and requesting processor, respectively.

The monitoring means 210 monitors if an authorization change information is received or detected (S210). The authorization change information indicates that a device is to become authorized for initiating an access in an extended coverage (i.e. to become authorized for coverage enhancement).

If the authorization change information is received or detected, respectively, (S210="yes"), the requesting means 220 requests paging the device (S220). The paging comprises an indication that the device is to become authorized for the initiating of the access in the extended coverage (i.e., an indication that the device becomes authorized for coverage enhancement).

Figure 11:
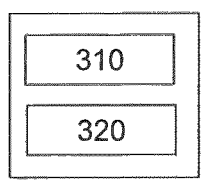
FIG. 11 shows an apparatus according to an embodiment of the invention.
Figure 12:
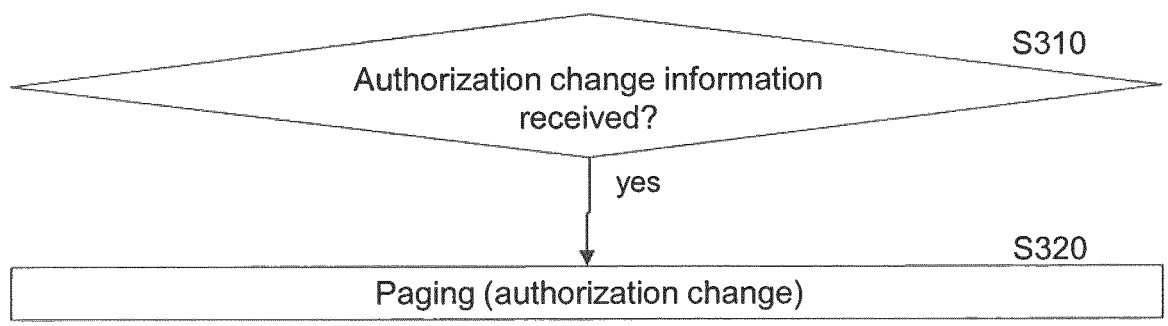
FIG. 12 shows a method according to an embodiment of the invention.

FIG. 11 shows an apparatus according to an embodiment of the invention. The apparatus may be a base station such as a eNB or NodeB, or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises monitoring means 310, and paging means 320. The monitoring means 310, and paging means 320 may be monitoring processor and paging processor, respectively.

The monitoring means 310 monitors if an authorization change information is received (S310). The authorization change information indicates that a device is to become authorized for initiating an access in an extended coverage (i.e. to become authorized for coverage enhancement).

If the authorization change information is received (S310="yes"), the paging means 320 pages the device (S320). The paging comprises an indication that the device is to become authorized for the initiating of the access in the extended coverage (i.e., an indication that the device becomes authorized for coverage enhancement).

Figure 13:
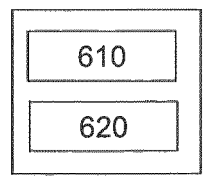
FIG. 13 shows an apparatus according to an embodiment of the invention.

FIG. 13 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 6, 8, 10, and 12.

Embodiments of the invention may be employed in a 3GPP network such as LTE or LTE-A, or in a 5G network. They may be employed also in other wireless or wireline communication networks such as CDMA, EDGE, UTRAN networks, WiFi networks, etc.

A terminal may be any apparatus capable to access the respective network. E.g., in 3GPP networks, a terminal may be a UE, an IoT device, etc. The terminal may be a smartphone, a laptop, a mobile phone etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. One or more of the described entities may be implemented in the cloud. In particular, each of the described entities may be implemented as a network slice.

According to the above description, it should thus be apparent that example embodiments of the present invention provide, for example a terminal such as a user equipment or a IoT device, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example an access node such as a base station (e.g. NodeB or eNodeB), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a core network entity such as a MME, a SGSN, etc., or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a data repository such as a HSS, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. They may be implemented fully or partly in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. A method, comprising:
checking if a device is authorized for initiating an access in an extended coverage;
inhibiting the device to initiate the access while the device camps in the extended coverage and the device is not authorized for the initiating of the access in the extended coverage;
monitoring if a paging message for the device is received while the device camps in the extended coverage, wherein the paging message is to initiate a signaling access in the extended coverage for a signaling procedure to get the latest status of coverage authorization; and
allowing the device to initiate the signaling access while the device camps in the extended coverage if the paging message is received.

2. The method according to claim 1, further comprising:
checking if a reauthorization for initiating the access in the extended coverage is allowed for the device; and
prohibiting, if the reauthorization is not allowed, the device to monitor if the paging message for the device is received.

3. The method according to claim 2, further comprising:
monitoring if camping on a suitable cell in a normal coverage is possible, wherein, in the normal coverage, the device is authorized to initiate the access;
monitoring if camping on the suitable cell in the extended coverage is possible; and
instructing the device to camp on the suitable cell in extended coverage if camping on the suitable cell in the normal coverage is not possible, camping on the suitable cell in extended coverage is possible, and the reauthorization is allowed, regardless of whether or not camping on an acceptable cell is possible.

4. The method according claim 3, further comprising:
checking if a support for emergency calls is required;
determining if camping on the acceptable cell in the normal coverage is possible; and
inhibiting the instructing of the device to camp on the suitable cell and instructing the device to camp on the acceptable cell if the support for emergency calls is required and camping on the acceptable cell in the normal coverage is possible.

5. The method according to claim 1, wherein the monitoring if the paging message is received is performed with a different discontinuous reception period than the monitoring for a normal paging message different from the paging message indicating that the device is to become authorized.

6. The method according to claim 1, further comprising:
reauthorizing the device to initiate the access in the extended coverage during a signaling exchange taking place after the device receives the paging message.

7. The method according to claim 6, wherein the signaling exchange is a tracking area update signaling exchange.

8. An apparatus comprising:
at least one processor; and
at least one memory including computer program code;
the at least one memory and the computer program code configured to, with the at least one processor, cause the apparatus at least to:
check if a device is authorized for initiating an access in an extended coverage;
inhibit the device to initiate the access while the device camps in the extended coverage and the device is not authorized for the initiating of the access in the extended coverage;
monitor if a paging message for the device is received while the device camps in the extended coverage, wherein the paging message is to initiate a signaling access in the extended coverage for a signaling procedure to get the latest status of coverage authorization; and
allow the device to initiate the signaling access while the device camps in the extended coverage if the paging message is received.

9. The Apparatus according to claim 8, wherein the at least one processor and the computer program code are further configured to cause the apparatus to:
check if a reauthorization for initiating the access in the extended coverage is allowed for the device; and
prohibit, if the reauthorization is not allowed, the device to monitor if the paging message for the device is received.

10. The apparatus according to claim 9, wherein the at least one processor and the computer program code are further configured to cause the apparatus to:
monitor if camping on a suitable cell in a normal coverage is possible, wherein, in the normal coverage, the device is authorized to initiate the access;
monitor if camping on the suitable cell in the extended coverage is possible; and
instruct the device to camp on the suitable cell in extended coverage if camping on the suitable cell in the normal coverage is not possible, camping on the suitable cell in extended coverage is possible, and the reauthorization is allowed, regardless of whether or not camping on an acceptable cell is possible.

11. The apparatus according claim 10, wherein the at least one processor and the computer program code are further configured to cause the apparatus to:
check if a support for emergency calls is required;
determine if camping on the acceptable cell in the normal coverage is possible; and
inhibit the instructing of the device to camp on the suitable cell and instructing the device to camp on the acceptable cell if the support for emergency calls is required and camping on the acceptable cell in the normal coverage is possible.

12. The apparatus according to claim 8, wherein the apparatus configured to monitor if the paging message is received is performed with a different discontinuous reception period than the monitoring for a normal paging message different from the paging message indicating that the device is to become authorized.

13. The apparatus according to claim 8, wherein the at least one processor and the computer program code are further configured to cause the apparatus to:
reauthorize the device to initiate the access in the extended coverage during a signaling exchange taking place after the device receives the paging message.

14. The apparatus according to claim 13, wherein the signaling exchange is a tracking area update signaling exchange.

* * * * *